E. H. SMITH

Aug. 9, 1932. BREAD TOASTER Re. 18,566

3 Sheets-Sheet 1

Original Filed Jan. 12, 1927

Inventor
ELMER H. SMITH
By Paul, Paul & Moore
ATTORNEYS

E. H. SMITH

Aug. 9, 1932. BREAD TOASTER Re. 18,566

3 Sheets-Sheet 2

Original Filed Jan. 12, 1927

Inventor
ELMER H. SMITH
By Pauls, Paul & Moore
ATTORNEYS

E. H. SMITH

BREAD TOASTER

Aug. 9, 1932.

Re. 18,566

3 Sheets-Sheet 3

Original Filed Jan. 12, 1927

Inventor
ELMER H. SMITH
By Paul, Paul & Moore
ATTORNEYS

Reissued Aug. 9, 1932

Re. 18,566

UNITED STATES PATENT OFFICE

ELMER H. SMITH, OF MINNEAPOLIS, MINNESOTA, ASSIGNOR, BY MESNE ASSIGNMENTS, TO ELMER H. SMITH, AS TRUSTEE FOR HIMSELF AND WALTER E. JOHNSON AND J. J. HUEBSCHER

BREAD TOASTER

Original No. 1,720,451, dated July 9, 1929, Serial No. 160,671, filed January 12, 1927. Application for reissue filed April 24, 1930. Serial No. 447,072.

This invention relates to new and useful improvements in bread toasters.

An object of this invention is to provide a bread toaster comprising a base having a bread holder centrally mounted thereon and also having pivotally mounted heating elements adapted to be moved into bread-toasting positions adjacent to the sides of said bread holder, and further having means for automatically moving the heating elements to their non-toasting positions, after a predetermined interval.

Another object is to provide a bread toaster having a stationary bread holder, as distinguished from a movable bread holder, and having heating elements mounted one at each opposite side of the bread holder in a manner to be moved toward and away therefrom, and in a manner to flank the faces of the greatest area of the holder substantially throughout their entire surface areas.

A further object is to provide a bread toaster having a pair of oppositely movable heating elements pivotally mounted upon the base thereof with means for moving them into upright bread-toasting positions adjacent to a bread holder; means also being provided for moving the elements away from the bread holder to their non-toasting positions.

Other objects of the invention reside in the constructional details of the apparatus; the manner of mounting the heating elements upon the base; the provision of a bread toaster having its top, bottom, and ends open while toasting; and the simplicity of the apparatus as a whole.

Other objects of the invention will appear from the following description and accompanying drawings and will be pointed out in annexed claims.

In the drawings there has been disclosed a structure designed to carry out the various objects of the invention but it is to be understood that the invention is not confined to the exact features shown, as various changes may be made within the scope of the claims which follow.

In the accompanying drawings forming part of this specification:

Figure 1:
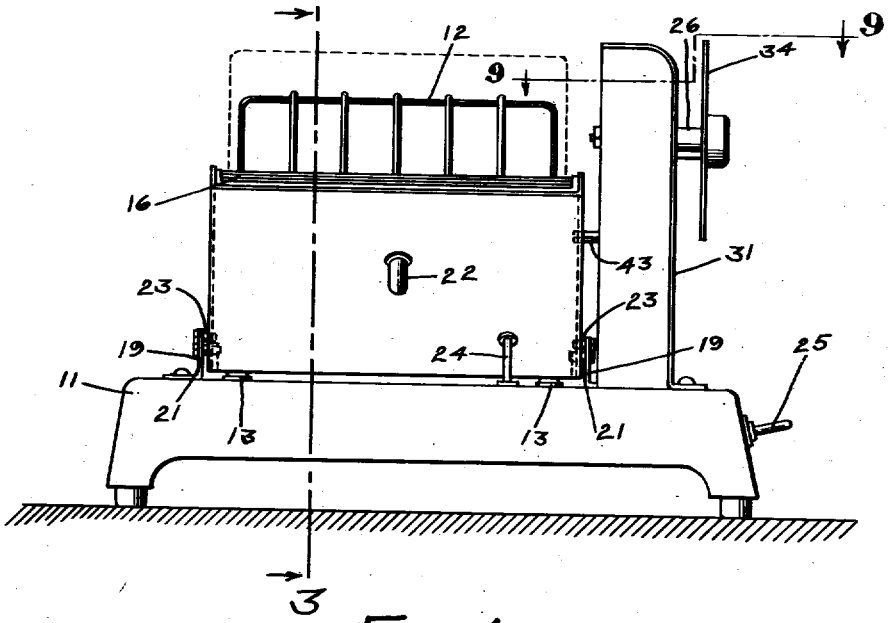
Figure 1 is a side elevation of the improved bread toaster showing the hinged heating elements in non-toasting positions.
Figure 2:
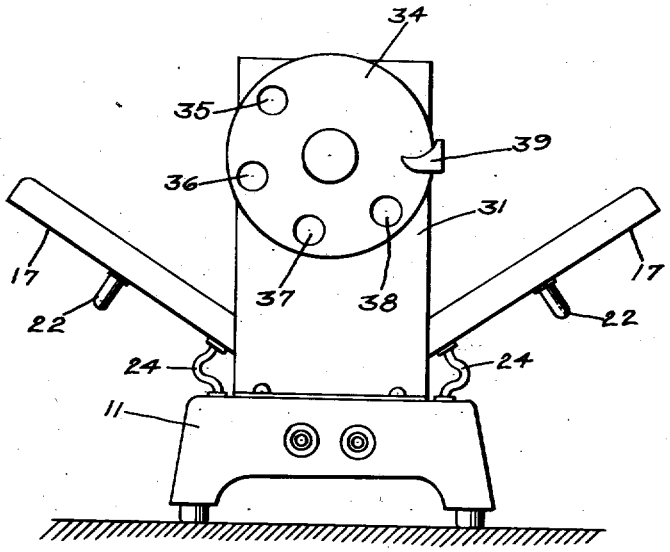
Figure 2 is an end view of Figure 1.

Fgure 9 is a sectional plan view on the line 9—9 of Figure 1; and

Figure 9:
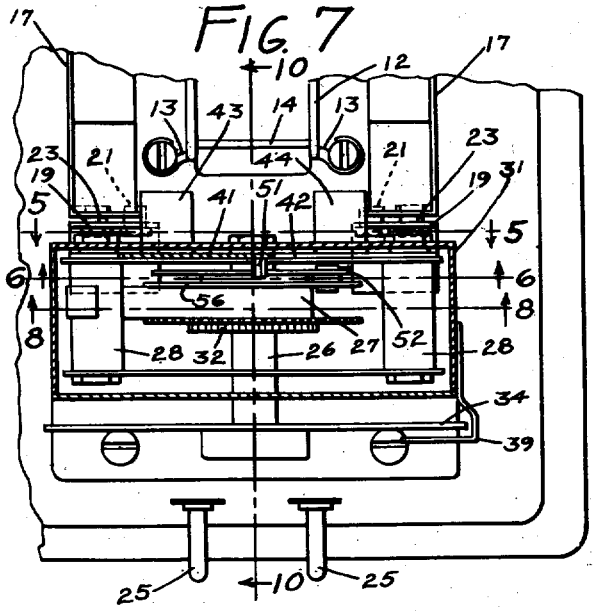
Figure 10:
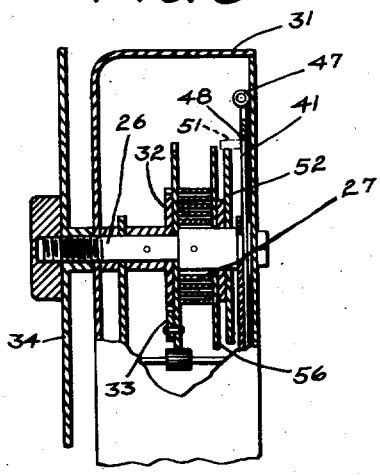

Figure 10 is a vertical sectional view on line 10—10 of Figure 9.

Figure 3:
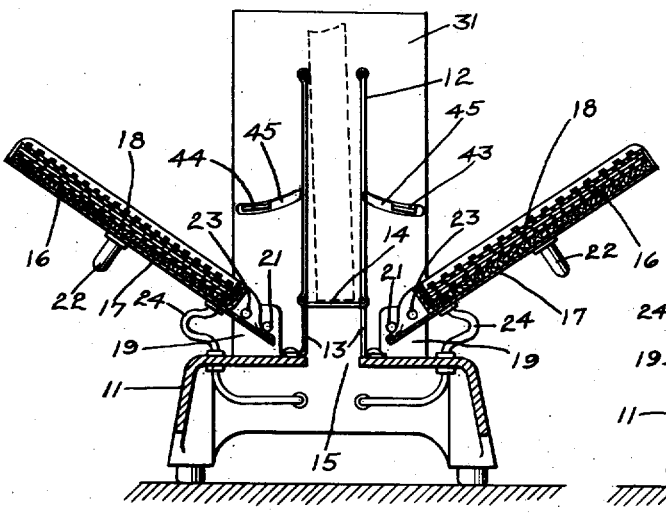
Figure 3 is a vertical sectional view on line 3—3 of Figure 1.
Figure 4:
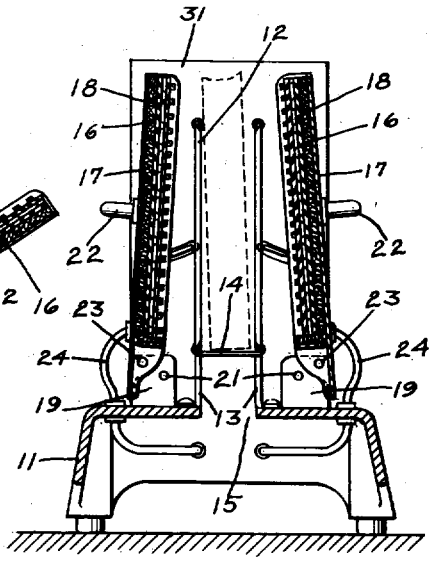
Figure 4 is a similar view showing the heating elements in their bread-toasting positions.
Figure 5:
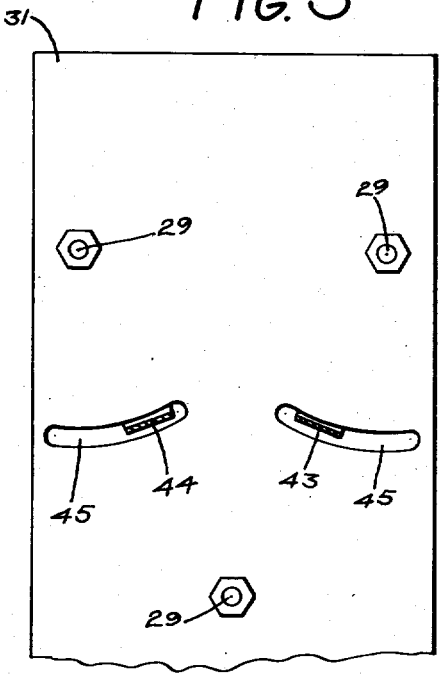
Figure 5 is a vertical sectional view on line 5—5 of Figure 9.

In the selected embodiment of the invention here shown, there is illustrated a bread toaster comprising a base 11 having a bread holder 12 mounted thereon, as shown in Figures 3 and 4. This holder is preferably constructed of wire members as shown in Figure 1, and is supported upon suitable legs or feet 13 secured to the top of the base. The bottom 14 of the bread holder 12 is spaced from the top wall of the base 11, which has an elongated opening 15 therein. The top and both ends of the bread holder are open so that the bread may be inserted at the top or one end.

A feature of the invention resides in the mounting of the heating elements 16 upon the base 11. Each heating element comprises a frame 17, preferably of sheet metal, and having an electric resistance coil 18 mounted thereon and suitably insulated therefrom.

Each frame 17 is pivoted upon brackets 19 secured to the base 11. Stop pins 21 are secured in the brackets 19 to limit the outward movement of the heating elements 19, as shown in Figure 3. Each heating element is further provided with a hand grip 22 whereby it may be manually raised to its operative bread-toasting position, as shown in Figure 4. The pivots 23 of the heating elements are preferably so arranged that the heating elements will be held in their operative positions by gravity. Flexible connections 24 connect the heating elements with suitable terminals 25 adapted to be received in the usual socket of an electric cord, not shown.

The mounting of the heating elements in the above described manner provides a very simple and inexpensive structure. When the heating elements are in their inoperative positions, as shown in Figure 3, the bread holder is exposed on substantially all sides, as there are no end walls or top member. When the heating elements are in their bread-toasting positions, as shown in Figure 4, the bread supported in the holder 12 may be viewed from one end or from the top of the toaster.

A feature of the invention relates to the arrangement of the heating element mounts 17 (or the heating elements) whereby when they are in upright or operative position as shown in Figure 4, the toast can be viewed, and it is conceivable that the proportionate height of the clock mechanism and the arrangement of the tripping elements 43—44 may be such that the entire piece of bread can be viewed from three sides. It is evident, however, that the heating element mounts may be constructed to substantially enclose the stationary support when in cooking position.

It will be noticed that the bread holder is formed of opposed grid-like elements which provide means for supporting the bread, as well as for permitting heat to be applied to both faces of it. It will be further noted that when the elements 17 are in cooking position their faces are substantially parallel with and are opposed to the corresponding faces or vertical grid-like sides of the holder. The arrangement is, therefore, such that when in cooking position the holder lies wholly between the heating elements. In this way the bread is properly supported, prevented from engaging the heating elements, and yet heat can be applied throughout the entire surface area of those faces of greatest area.

Means are provided for moving the heating elements from their bread-toasting to their inoperative positions, shown in Figure 3. Such means consist of a suitable clock mechanism comprising a main shaft 26 having a spring 27 coiled thereabout with one end secured thereto and its other end engaging a spacing collar 28, mounted upon a pin 29. This collar and pin cooperate with similar collars and pins 28 and 29, to secure together the walls of the clock casing 31. A ratchet wheel 32 is secured to the shaft 26 and is engaged by a pawl 33 which functions to retain the shaft 26 in its operative position, when the spring 27 is under tension. A disk 34 is terminally secured to the shaft 26, exteriorly of the casing 31, and has a series of finger-receiving holes 35, 36, 37 and 38 by means of which the disk, and therefore the shaft 26, may be rotated clockwise. A finger stop 39 is arranged to be engaged by the operator's finger, to limit the rotation of the disk 34. Pivotally attached to the clock casing 31 are depending levers 41 and 42 having lugs 43 and 44, respectively, projecting through arcuately formed slots 45 provided in the wall of the casing 31, as shown in Figures 5, 6, 7 and 8. The lugs 43 and 44 project through the slots 45 and extend into the path of heating elements 16 as shown in Figure 1, so that when the heating elements are in their operative positions, as shown in Figure 4, and the lugs 43 and 44 are outwardly moved as a result of their connection with the clock mechanism, the lugs will engage the inner portions of the heating elements and swing them outwardly until they drop by gravity into the positions shown in Figure 3. When the heating elements are thus positioned, the bread may be kept hot without danger of burning it.

Figure 7:
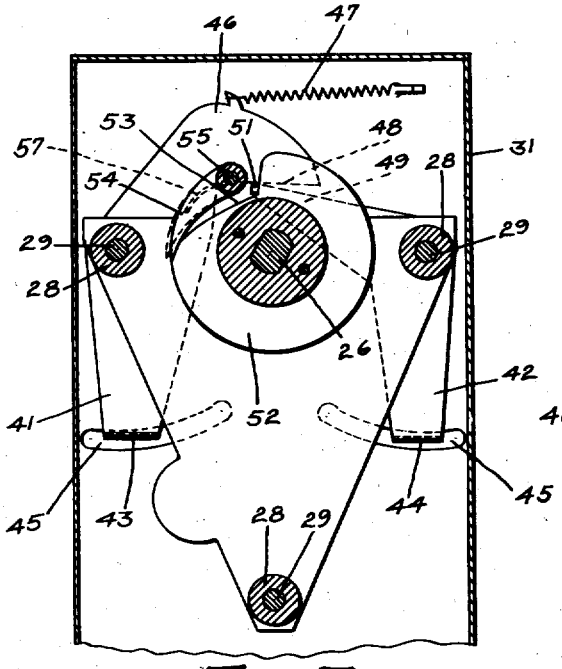
Figure 7 is a view similar to Figure 6 with the parts in different positions.
Figure 8:
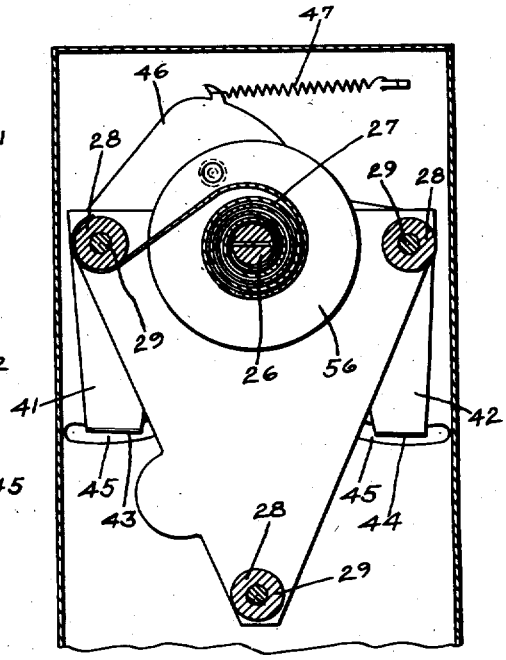
Figure 8 is a vertical sectional view on line 8—8 of Figure 9.

The depending arm 41 is provided with an offset portion 46 having a tension spring 47 connected therewith which tends to swing the arm 41 on its pivot in an outward direction. The extension 46 has a straight edge 48 engaging an extension 49 provided upon the arm 42. This extension 49 of the arm 42 has an offset lug 51 riding upon a cam disk 52 as shown in Figure 7. This lug 51 is held in constant contact with the periphery of the cam disk 52 by the action of the spring 47. The disk 52 is provided with a cutaway portion 53 within which is mounted a spring actuated gate 54 carried by a pin 55 supported by a disk 56 spaced from the cam-like disk 52.

Figure 6:
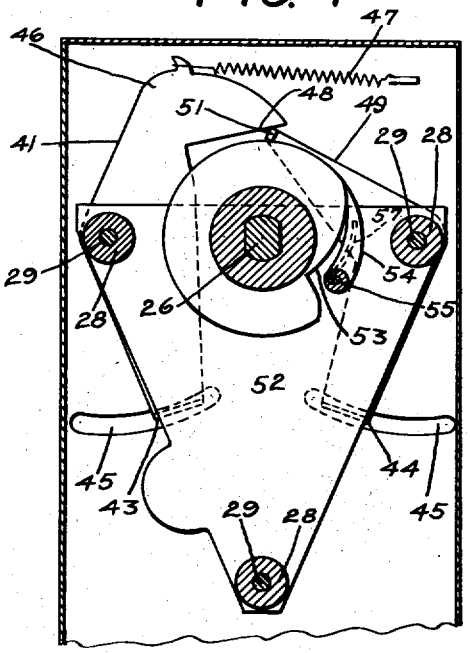
Figure 6 is a vertical sectional view on line 6—6 of Figure 9.

At the beginning of the winding operation the lug 51 is positioned at the cutaway portion of the cam disk 52, as shown in Figure 7. During the winding operation, the cam disk is moved from the position shown in Figure 7 to a position such as shown in Figure 6, the exact amount of movement of the disk being determined by the extent to which the disk 34 is rotated. As the lug 51 slides up the cam portion of the disk 52, it forces the gate 54 open against the tension of a small spring 57 to permit the passage of the lug, after which the gate again closes. As the lug 51 is thus moved outwardly, the levers 41 and 42 are moved into the position shown in Figure 6. This causes the lugs 43 and 44 to move inwardly to the positions shown in Figure 5 so that the heating elements may be moved to their operative positions, as shown in Figure 4, without interference from the projecting lugs 43 and 44. After the clock mechanism has thus been reset and the arms 41 and 42 move inwardly to the positions shown in Figures 4, 5 and 6, they will remain in such positions until the clock mechanism has rotated the disks 51 and 56, and therefore the gate 54, to the position shown in Figure 7, wherein it will be noted that the lug 51 has passed over the outer edge of the gate 54 and has dropped into the cutaway portion of the cam disk 52 by the action of the spring 47. Such movement of the lug 51 will cause the arms 41 and 42 to be moved outwardly with the result that the projecting lugs 43 and 44 will engage the heating elements and automatically move them outward to their inoperative positions as shown in Figure 3.

It will be noted that the elements 52 and 54 move in unison. When disk 52 is moved in direction to wind the spring, it will always be moved sufficiently to bring that part of its periphery which is farthest from its center of rotation, into engagement with the lug 51 after which it can only arrive at its position in Figure 7, by riding upon the outer periphery of the gate 54, which surface forms a continuation or segment of the circular periphery of the disk.

This clock mechanism is shown and described in detail in the above mentioned patent, and I do not claim the constructional details thereof as a part of this invention. Obviously, other mechanisms might be used for actuating the heating elements 16 in a manner similar to that above described. In the drawings I have shown the heating means as electrically heated, but it is to be understood that by slightly modifying the frames 17, they may be adapted for gas burners, the use of which may be desirable in the construction of large toasters such as are used in restaurants and cafes.

A feature of the invention is the arrangement of the pivotal centers 23 of the heater supports, with reference to the stationary toast holder, so that the elements 17 can be held in toasting position by gravity as shown in Figure 4, against stops 43—44 or their equivalents. This is possible because of the arrangement of the pivots near the lower ends of the heating elements, and so that when against the stops 43—44 they slant inwardly, and thus their weight holds them as shown. When the stops 43—44 (in this instance shown as tripping means) are moved away from one another, the supports 17 are merely pushed over the center, and the weight of the element then carries it to the position shown in Figure 3, the movement being limited by the stops 21. Thus the elements are held in toasting position by gravity and after an initial kick or motion of the elements 43—44 are pushed over the center to drop by gravity to open position.

This novel toaster, as shown, is adapted to toast both sides of each bread slice at the same time. However, by making the bread holder wider, two slices may be inserted at one time, in which case each slice will have one side toasted at a time. The elongated opening 15 in the base permits air to circulate therethrough.

I claim as my invention:

1. A bread toaster having a stationary holder adapted to hold an article to be cooked in upright position, heating element supports pivoted adjacent their lower portions adjacent said holder and adapted to swing toward and away from it, said elements having heating means adapted to cook an article on the support when the elements are placed adjacent thereto, means against which elements rest by gravity when in cooking position, said means being operative to move the elements to the opposite side of their pivotal centers to cause them to fall by gravity in a direction away from said holder.

2. A bread toaster having a stationary holder, heating element supports arranged one at each opposite side of said holder, and adapted to move toward and away therefrom, and means cooperative with said supports to limit their motion at cooking position near the holder in a manner to permit inspection of the article during the cooking period.

3. A device of the class described comprising a base having a stationary bread holder thereon, heating element supports pivoted to said base adjacent their lower ends, and adjacent the lower portion of the bread holder and having heating elements adapted when the holders are swung to bring the heating elements in opposition to an article held in the holder, means to limit the movement of the elements in direction toward the holder so that they are held in cooking position by gravity, means for moving them over their pivotal centers and causing them to fall by gravity in a direction away from said holder.

4. A bread toaster comprising an immovable bread support, a pair of heating elements mounted one at opposite sides of said support and adapted to move toward and away therefrom, means cooperative with said heating elements to form therewith a partly closed chamber about said support when said heating elements are nearest the support.

5. A cooking apparatus comprising a support for the article to be cooked, heating elements movably mounted one at each opposite side of said support, means cooperative with said elements to form a partly closed heating chamber about the support when in position to cook the supported article, and timing means adapted to automatically move said heating elements in opposite directions and away from the support and one another at the end of a predetermined period, including means engageable by said heating elements when moved to cooking position to hold said heating elements at such position.

6. A bread toaster comprising a base, heating elements pivotally mounted on said base and adapted to be moved to upright operative positions, an immovable bread holder mounted between said heating elements, and means for moving the heating elements outwardly away from the bread holder to inoperative positions.

7. A bread toaster comprising a base, heating elements pivotally mounted on said base and having means for moving them to upright operative positions, and an immovable bread holder mounted between said heating elements, said bread holder being open at the bottom, top, and ends.

8. A bread toaster comprising a base having an elongated opening therein, a bread holder immovably mounted on the base over said opening and with its bottom spaced from the top wall of the base, said bread holder being open at the top and at one end to permit a slice of bread to be inserted therein, a heating element pivotally mounted upon the base at each side of said bread holder and having means for connection with a source of electrical energy, means for moving said heating elements to upright bread-toasting positions adjacent to said bread holder, and a timing mechanism adapted to automatically move said heating elements to non-toasting positions, after a predetermined length of time.

9. A bread toaster comprising a base, a bread holder secured thereon and having its bottom spaced therefrom, said holder being open at its top and ends, a heating element at each side of the holder, and means on the base adapted to pivotally support said heating elements.

10. A bread toaster comprising a base, a bread holder secured thereon, a movable heating element at each side of the holder, members for supporting the heating elements, lugs secured to the base for pivotally supporting said members, means on said lugs for limiting outward movement of the element-supporting members, and the pivotal connections of said members with said lugs being such as to cause the members to be held in bread-toasting position by gravity.

11. A bread toaster having a stationary bread holder and having heating elements mounted one at each opposite side to swing toward and away from the holder, and opposed to said holder, and means against which said elements rest by gravity to hold them in cooking position.

12. A bread toaster having a stationary bread holder and having heating elements mounted one at each opposite side to swing on substantially a horizontal axis outward and away from the holder, and means for limiting outward motion of the heating elements and holding said elements in such spaced relation to the holder that sufficient heat can be radiated to keep the article warm, but not sufficient to continue cooking of it.

In witness whereof I have hereunto set my hand this 16th day of April, 1930.

ELMER H. SMITH.